(12) United States Patent
Millette et al.

(10) Patent No.: US 9,516,921 B2
(45) Date of Patent: *Dec. 13, 2016

(54) METHOD FOR MANUFACTURING INFLATABLE FOOTWEAR OR BLADDERS FOR USE IN INFLATABLE ARTICLES

(71) Applicant: Reebok International Limited, London (GB)

(72) Inventors: Frank Millette, Middleborough, MA (US); Brian Christensen, Centerville, MA (US); Paul M. Davis, Blackstone, MA (US); Paul E. Litchfield, Westboro, MA (US)

(73) Assignee: Reebok International Limited, London (GB)

( * ) Notice: Subject to any disclaimer, the term of this patent is extended or adjusted under 35 U.S.C. 154(b) by 163 days.

This patent is subject to a terminal disclaimer.

(21) Appl. No.: 14/033,213

(22) Filed: Sep. 20, 2013

(65) Prior Publication Data

US 2014/0053968 A1 Feb. 27, 2014

Related U.S. Application Data

(63) Continuation of application No. 12/624,232, filed on Nov. 23, 2009, now Pat. No. 8,540,838, which is a
(Continued)

(51) Int. Cl.
*A63B 39/00* (2006.01)
*A63B 41/00* (2006.01)
(Continued)

(52) U.S. Cl.
CPC ............ *A43D 25/06* (2013.01); *A43B 13/203* (2013.01); *B29C 65/18* (2013.01); *B29C 66/004* (2013.01);
(Continued)

(58) Field of Classification Search
CPC .......... B29C 65/00; B29C 65/02; B29C 65/18; B29C 2793/0009; B29C 66/1122; B29C 66/24; B29C 66/242; B29C 66/43; B29C 66/004; B29C 66/0046; B29C 66/00461; B29C 66/00463; B29C 66/433; B29C 66/432; B29C 66/4326; B29C 66/439; B29L 2022/02; B29L 2022/025; B29L 2031/50; B29L 2031/504; A43B 13/20; A43B 13/203; B32B 37/0076
(Continued)

(56) References Cited

U.S. PATENT DOCUMENTS 3,685,176 A 8/1972 Rudy
4,536,434 A 8/1985 Magnotta
(Continued)

FOREIGN PATENT DOCUMENTS

GB 1119232 A * 7/1968 ............ B29C 65/02
JP 07-171923 7/1995
WO WO 02/26463 A2 4/2002

*Primary Examiner* — Philip Tucker
*Assistant Examiner* — Brian R Slawski
(74) *Attorney, Agent, or Firm* — Sterne, Kessler, Goldstein & Fox P.L.L.C.

(57) ABSTRACT

The present invention is a method for manufacturing inflatable articles, or bladders for inflatable articles, that is time-efficient, simple, inexpensive and permits the uninterrupted manufacture of numerous and even customized article or bladder configurations and sizes, without expensive configuration-specific, metal tooling. The method includes the steps of applying a barrier material to a side of a first film, providing a second film with the first film so that the barrier material is disposed between the first and second films, adhering the first film to the second film so that the films are sealed together in areas except where the barrier material has been applied to form at least one inflatable compartment and sealed peripheral edge, and cutting along
(Continued)

the sealed peripheral edge to form an inflatable article or bladder for use in an article of manufacture. The barrier material may be a paint, ink, paper or surface treatment that effectively prevents the first film from adhering to the second. The inflatable article or bladder of the present invention may be used as or in athletic equipment, for example, including footwear.

3 Claims, 7 Drawing Sheets

Related U.S. Application Data continuation of application No. 11/171,475, filed on Jul. 1, 2005, now Pat. No. 7,622,014.

(51) Int. Cl.
| | |
|---|---|
| *B29C 65/00* | (2006.01) |
| *B32B 37/00* | (2006.01) |
| *B32B 38/04* | (2006.01) |
| *B32B 38/14* | (2006.01) |
| *C08J 5/00* | (2006.01) |
| *A43B 13/20* | (2006.01) |
| *A43B 21/28* | (2006.01) |
| *A43D 25/06* | (2006.01) |
| *B29C 65/18* | (2006.01) |
| *B29C 59/04* | (2006.01) |
| *B29L 22/02* | (2006.01) |
| *B29L 31/50* | (2006.01) |
| *B32B 38/06* | (2006.01) |

(52) U.S. Cl.
CPC ........... *B29C 66/1122* (2013.01); *B29C 66/43* (2013.01); *B29C 66/4326* (2013.01); *B29C 66/83413* (2013.01); *B32B 37/0076* (2013.01); *B29C 59/04* (2013.01); *B29C 66/00461* (2013.01); *B29C 66/00463* (2013.01); *B29C 66/24* (2013.01); *B29C 2791/009* (2013.01); *B29C 2793/0009* (2013.01); *B29C 2793/009* (2013.01); *B29C 2795/002* (2013.01); *B29L 2022/02* (2013.01); *B29L 2031/50* (2013.01); *B32B 38/06* (2013.01); *Y10T 156/108* (2015.01); *Y10T 156/1052* (2015.01)

(58) Field of Classification Search
USPC ................ 156/60, 90, 91, 92, 93, 145, 146, 147,156/242, 246, 250, 267, 272.2, 273.3, 275.5,156/275.7, 277, 278, 279, 289, 290, 292, 313,156/308.2, 308.4, 309.6; 36/29, 35 B; 428/304.4

See application file for complete search history.

(56) References Cited

U.S. PATENT DOCUMENTS

| | | | |
|---|---|---|---|
| 4,711,907 A | | 12/1987 | Sterzel et al. |
| 4,991,317 A | | 2/1991 | Lakic |
| 5,022,109 A | * | 6/1991 | Pekar ................. 5/706 |
| 5,113,599 A | | 5/1992 | Cohen et al. |
| 5,351,710 A | * | 10/1994 | Phillips .......... 137/223 |
| 5,418,016 A | | 5/1995 | Cornforth et al. |
| 5,514,431 A | * | 5/1996 | Shimomura .......... 428/35.3 |
| 5,916,830 A | | 6/1999 | Graham |
| 5,993,585 A | * | 11/1999 | Goodwin et al. ......... 156/145 |
| 2004/0151927 A1 | | 8/2004 | Gauthier et al. |
| 2004/0261202 A1 | * | 12/2004 | Baek .............. 12/142 N |

* cited by examiner

METHOD FOR MANUFACTURING INFLATABLE FOOTWEAR OR BLADDERS FOR USE IN INFLATABLE ARTICLES

CROSS-REFERENCE TO RELATED APPLICATIONS

This application is a continuation of U.S. application Ser. No. 12/624,232, filed Nov. 23, 2009, now U.S. Pat. No. 8,540,838, which is a continuation of U.S. application Ser. No. 11/171,475, filed Jul. 1, 2005, now U.S. Pat. No. 7,622,014, the disclosures of which are incorporated herein in their entireties by reference.

BACKGROUND OF THE INVENTION

Field of the Invention

The present invention relates to a method for manufacturing inflatable articles or fluid-impervious bladders for use in inflatable articles, such as footwear or apparel.

Background Art

Inflatable articles of manufacture or bladders for use in inflatable articles of manufacture have been known for decades. Such articles of manufacture include inflatable air mattresses and pillows, inflatable life preservers and rafts, and athletic equipment. In the field of athletic equipment, inflatable bladders have been incorporated in the interior of balls (e.g., basketballs, footballs, soccer balls, etc.), as well as in articles of protective apparel such as baseball and boxing gloves, helmets, chest protectors and footwear. When utilized in footwear, an inflatable bladder may be used to provide customized cushioning to the wearer's foot and to enhance fit. In some instances, an inflatable bladder may take the place of a lacing system to secure the shoe to the foot of the wearer. Inflatable bladders may also be used in the sole of a shoe to provide cushioning to the bottom of the wearer's foot and to absorb impact forces from walking, running and jumping.

U.S. application Ser. No. 10/887,927 filed on Jul. 12, 2004 (and published as U.S. Published Patent Application No 20050028404-A1 on Feb. 10, 2005) discloses a Shoe Having an Inflatable Bladder. Applicants incorporate the entire disclosure of this application, herein, by reference.

U.S. Pat. No. 5,113,599 to Cohen et al. (the '599 patent) discloses an athletic shoe having an inflatable bladder. This patent discloses a variety of inflatable bladder configurations for use in the tongue, lateral and medial shoe sides, around the ankles, beneath the foot or in the entirety of the shoe. The bladder of the patent is formed from a first thermoplastic urethane (TPU) film and a co-extensive second TPU film. The first and second films are attached to each other along pre-defined weld or pattern lines. A peripheral weld line of the bladder creates a sealed bladder compartment or chamber and prevents air from escaping therefrom. The first and second films are further attached to each other at a number of circular points or interior weld lines to control the thickness of the bladder to prevent undesired "bulging", which could cause discomfort to the wearer or inhibit proper fit.

The first and second films of the bladder of the '599 patent are welded together using radio frequency (RF) or dielectric welding. RF or dielectric welding uses high frequency radio energy to agitate the molecules of thermoplastic materials to a point where they melt and weld together to form a strong bond. To weld the bladder of the '599 patent, the coextensive films are placed between a brass die (having raised areas representing the desired peripheral, circular and interior weld lines) and a platten on an RF machine. After bringing the brass die and RF platten into contact with each other, the RF machine is activated and the first and second films are bonded to each other only at the raised areas on the brass die to form the peripheral, circular and interior weld lines. Upon completion of the welding step, the inflatable bladder is die-cut from the remainder of the coextensive first and second films and assembled into the shoe as appropriate by adhesives, conventional stitching or other fastening means. The first and second films of the '599 patent may also be adhered to each other by conventionally heated and appropriately patterned brass dies or by application of chemical adhesives or bonding agents suitable for use with thermoplastic films.

The patent further discloses inflation of the bladder by a pump permanently affixed to the bladder using the RF welding technique described above or any other sealing method appropriate for use with the films thereof. Alternatively, the bladder may be inflated by an off-board pump connectable to an inflation/deflation valve, also affixed to the bladder in a location easily accessed by the wearer. Other pumps and valves, suitable for use with inflatable bladders for footwear, are disclosed in U.S. Pat. Nos. 5,074,765 and 5,144,708.

While manufacture of an inflatable bladder using RF welding requires no adhesives or additional materials, and has the advantages of precise patterning, decreased heat-degradation in areas of the film adjacent to weld lines and strength of seal, it is costly and time consuming to machine or chemically etch the brass dies for the inflatable bladder patterns, particularly where an article of manufacture is produced in a large range of sizes and in multiple configurations. Conventionally heated brass dies are also expensive to form, while chemical adhesion is messy and requires cure time in controlled environments. In addition, RF welding techniques are extremely sensitive and require that the films be sufficiently thick to prevent excessive melting of the film, thereby causing a breach of the bladder.

Thus, it is desirable to provide a method for manufacturing inflatable articles or bladders for use in inflatable articles which is relatively inexpensive, time efficient and allows for the manufacture of a variety of bladder configurations and sizes, utilizing a process and materials resulting in little to no interruption or delay in the manufacturing process.

BRIEF SUMMARY OF THE INVENTION

The manufacturing method of the present invention is advantageous over those known in the art, in that it is simpler, essentially continuous in nature, easily modified to permit manufacture of a variety of inflatable article or bladder configurations, and more economical by avoiding the need for expensive configuration-specific, brass-machined tooling.

One embodiment of the present invention is a method for manufacturing an inflatable article of footwear, comprising the steps of providing a first film; applying a barrier material to a first side of the first film in a bladder configuration; providing a second film, such that the barrier material is disposed between the first film and the second film; adhering the first film to the second film to form a sealed peripheral area, except in the area where the barrier material has been applied, to the first film, to form at least one inflatable chamber; cutting along the sealed peripheral area to form a bladder having at least one inflatable compartment and a sealed peripheral edge; and incorporating the bladder into the article of footwear to form an inflatable article of footwear. The barrier material may be a paint, ink, paper, textile, photosensitive agent, particulate or acid. The barrier material may also be an embossed or textured surface on either film.

The method further comprises the step of forming a screen, template or stencil of a negative image of the bladder configuration and using the screen, template or stencil to apply the barrier material to the first film in the bladder configuration.

In another embodiment, the present invention is a method for manufacturing an inflatable bladder, comprising the steps of providing a first film having a first side and a second side; applying a barrier material to the first side of the first film; providing a second film to the first side of the first film, such that the barrier material is disposed between the first film and the second film; adhering the first film to the second film to form a sealed peripheral area, except in the area where the barrier film has been applied to the first side of the first film, to form at least one inflatable compartment corresponding in overall shape to a bladder configuration; and cutting along the sealed peripheral area to form a bladder having at least one inflatable compartment and a sealed peripheral edge.

The cutting step may be accomplished by a laser, water jet or metal die. The barrier material may be a paint, ink, paper, textile, particulate, photosensitive agent or acid. The barrier material may be printed on the first side of the first film.

The first or second film may be a laminate of a thermoplastic film affixed to a substrate. The bladder may comprise an elongated area for receiving a fitment for an inflation or deflation valve.

In yet another embodiment, the present invention is a method for manufacturing a customized inflatable article of manufacture, comprising the steps of providing a database, wherein said database comprises at least one information record for at least one customized bladder design; providing a first film; applying a barrier material to a first side of the first film in accordance with the at least one information record to form at least one customized bladder design on the first film; providing a second film with the first film, such that the barrier material is disposed between the first film and the second film; adhering the first film to the second film to form a sealed peripheral area, except in the area where the barrier material has been applied to the first film, to form at least one inflatable compartment corresponding in overall shape to the customized bladder design; and cutting along the sealed peripheral area to form a bladder having the at least one inflatable compartment and a sealed peripheral area.

The barrier material may be printed on the first film by a smart printer (using either a digital printer or other known printing technology) connected to the database. The cutting step may be performed by a laser printer also connected to the database. The information record may contain information on the customer's color preferences and foot anatomy.

BRIEF DESCRIPTION OF THE DRAWINGS/FIGURES

The accompanying drawings, which are incorporated herein and form a part of the specification, illustrate the present invention and, together with the description, further serve to explain the principles the present invention and to enable a person skilled in the relevant art to practice the same.

DETAILED DESCRIPTION OF THE INVENTION

It is desirable for inflatable articles of manufacture or bladders to be durable, as well as quick, easy and inexpensive to manufacture. The present invention seeks to reduce the cost and time typically associated with the manufacture of inflatable articles or bladders for use in inflatable articles of manufacture, by simplifying the manufacturing process and avoiding the need for brass tooling, which can be expensive and time-consuming to machine or form, as well as to change-out, to permit the manufacture of inflatable articles or bladders having numerous sizes and configurations.

While conventional bladder manufacturing methods rely on tooling, specific to the configuration of the bladder to weld or seal two or more films together to form inflatable areas or compartments, the method of the present invention employs a barrier material applied to one of the films (or both of the films in mirror image), in accordance with a pre-defined or customized pattern, to prevent the films from adhering together to create inflatable areas or compartments, when heat and/or pressure are applied thereto. The barrier material can be easily applied to either of the films, in various configurations, to permit manufacture of an inflatable article or bladder inexpensively, quickly, essentially continuously and with a high degree of manufacturing flexibility.

Figure 1:
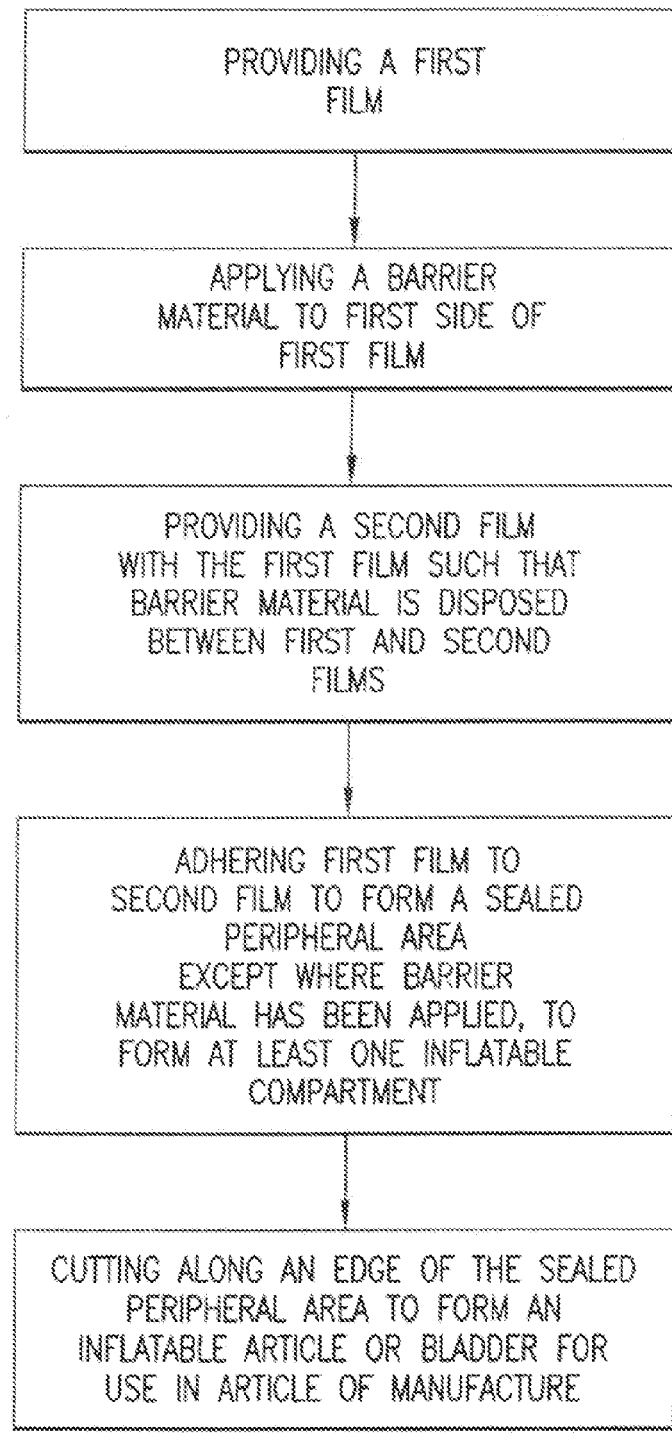
FIG. 1 is a depiction of the steps of the method of the present invention for manufacturing inflatable articles or bladders for use in inflatable articles.

As shown in FIG. 1, the method of the present invention generally comprises the steps of (1) providing a first film, which for most applications will be impervious to the fluid used to inflate the bladder or inflatable article of manufacture (2) applying a barrier material to a first side of the first film, (3) providing a second film with the first film such that the barrier material is disposed between the first film and the second film, (4) adhering the first film to the second film to form a sealed peripheral area, except in the area where the barrier material has been applied, to form at least one inflatable compartment, and (5) cutting along the sealed peripheral area to form an inflatable article or inflatable bladder having a sealed peripheral edge for use in an article of manufacture. It is also envisioned that the barrier material could be applied to the second film or to the facing sides of both films in mirror image. Alternatively, the barrier material could take the form of a separate material (or third film) simply positioned between the first and second films.

Turning now to the steps of the method, first and second films may be identical or different materials provided that they are each made from a thermoplastic material that may be adhered together to form a fluid-tight seal. Films can be formed from a variety of thermoplastic resins or other elastomeric materials, including but not limited to, thermal polyurethane (TPU), ethylenevinylacetate/polyethylene copolymer, polyester elastomer (e.g. Hytrel® material available from DuPont), polyethylene, polypropylene, neoprene, natural rubber, dacron/polyester, polyvinylchloride, thermoplastic rubbers, nitrile rubber, butyl rubber, sulfide rubber, methyl rubber, silicone rubber, polyvinyl acetate, buna N., buna S., polystyrene, ethylene propylene, polybutadiene, chlorfulfonated polythylene, nylon and others. One particular example of a suitable class of TPU film for the method of the present invention is a polyester urethane film available from JP Stevens under product no. ST1880. This film class has a Shore A hardness of 88-92 and a formulation having a base resin of Pellethane® (available from Dow Chemical), Estane® (available from Noveon) or Elastollan® (available from BASF). One skilled in the art can appreciate that any number of thermoplastic or elastomeric materials are suitable for use in the present invention, provided such materials are flexible and capable of forming a fluid-tight seal with another material having the same characteristics. It is further envisioned that sheet films employed in the food packaging arts, and other materials such as Mylar, could take advantage of the manufacturing method of the present invention.

Moreover, while the method of FIG. 1 has been described as providing a first and second "film", such film need not be a single ply of material. Indeed, either or both of the first and second films may be a laminate of a thermoplastic layer and a substrate applied to only one side of the thermoplastic layer (permitting the opposite side of the thermoplastic layer to be sealed to the second film (or laminate)). Substrates may be any of a variety of textiles, for example, any synthetic or natural fiber or fabric. One non-limiting example of a fabric used as a laminate of an inflatable bladder for footwear is a non-woven, high-density 70% nylon and 30% polyester blend, available from Dae Woo International Corporation (Pusan, Korea). Several methods have been developed to form laminates between thermoplastic layers and substrates. One such method includes direct cast extrusion of a thermoplastic resin onto a substrate to form a thin layer thereon. Provided that the substrate is at least partially porous, the thermoplastic resin will penetrate the pores of the substrate and bond thereto. Other laminate forming methods known to those skilled in the art would also be suitable for forming a laminate for use as the films of the present invention. For example, a laminate may be formed from a thermoplastic layer and a substrate by adhering the thermoplastic layer to the substrate by application of heat and pressure, an adhesive or bonding agent, or by ultrasonic bonding. Further, the laminate may include more than one thermoplastic layer, as well as more than one layer of substrate, provided that at least one thermoplastic layer is able to be sealed to another thermoplastic layer, to form at least one compartment of the inflatable bladder.

Turning now to Step 2 of the method set forth in FIG. 1, a barrier material is applied to a first side of the first film. The barrier material may be any material or treatment that prevents the first film from adhering to the second film of the invention upon application of heat and/or pressure. More particularly, the barrier material may be a paint, ink, TEFLON® coating, silicone coating, particulate or surface treatment that maintains the integrity of the thermoplastic layer of the first and second films, but still prevents the films from adhering to each other where the barrier material or treatment has been applied.

Where the barrier material is a paint, for example, the paint could be applied to the first film in accordance with Step 2 of the method in a manner similar to silk-screening. Silk-screening (or screen printing) is a long-used process for economically mass producing signage, prints and fabric designs, etc. The basic idea in silk-screening is to create a master screen through which paint (or other suitable media) passes to impart a design or imprint on a large number of duplicates. Generally, a drawing or tracing of a design is transferred by means of a photo process to a thin, fine grain photo sensitive gel coated cloth (or "silk"), which is tightly stretched over a frame. When the gel is exposed, the part of the gel that is exposed to light hardens or cures, while the unexposed part remains soft. After curing, the soft gel is washed away, leaving, a "negative" image of the design on the silk. The silk is open-celled (like a screen), so that the paint or other media can pass therethrough.

The framed silk is placed against the object upon which the design is to be imparted. Paint is then applied thereto and pulled across the silk with a squeegee or similar device to transfer the design through the silk to the object below. Where a design having multiple colors is desired, a separate screen must be prepared for each color (similar to the color separation process in conventional ink-printing methods). With the silk-screening method, thousands of "prints" can be made from a single silk. More recently, the printing screens are formed from monofilament materials such as polyester, rather than silk.

Figure 2:
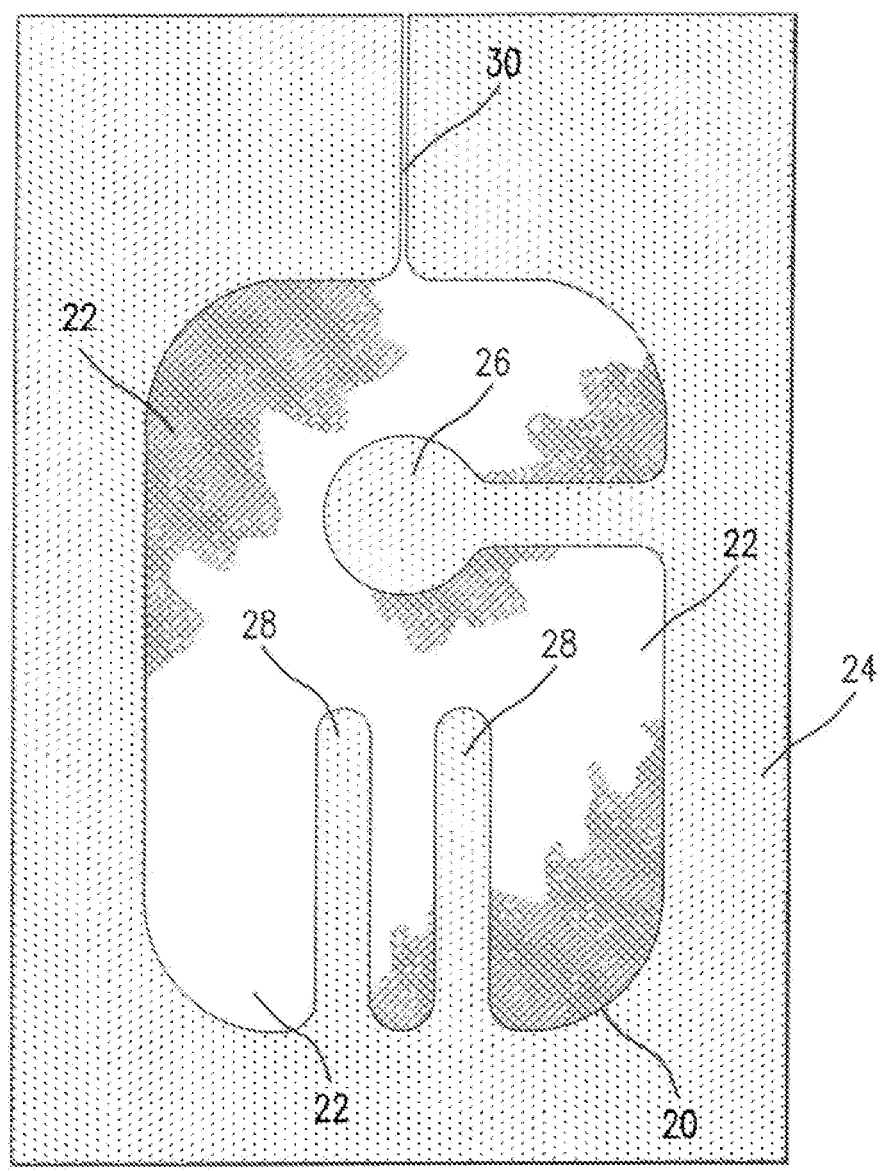
FIG. 2 is a negative image of an inflatable bladder design or configuration as formed on a printing screen.

By applying the silk-screening technique described above to the method of the present invention, a variety of bladder configurations and sizes can be "printed" on or imparted to the first film of Step 1 to function as the barrier material of the present invention. For example, FIG. 2 illustrates a negative image of an inflatable bladder design or configuration 20 as formed on a printing silk or screen 24. Where the screen or silk is visible in area 22 is where the paint, ink of other media will be transferred through the screen and onto the first film of Step 1. Bladder design or configuration 20 comprises a circular element 26 and linear elements 28, which prevent transfer of the paint, ink or other media onto the first film. When the first and second films are adhered together (in Step 3 of the method discussed below), the first and second films will adhere to each other at circular element 26 and linear elements 28 to form the equivalent of the circular welds and weld lines of the prior art described above, to control the thickness and inflation of the bladder and, with respect to apparel or footwear, to accommodate the anatomy of the human body. Negative image 20 of the inflatable bladder design or configuration also includes a visible area of screen 30, which extends from the edge of the screen into area 22. Area 30 is conduit-like in shape and is intended to form a passage for receiving an inlet or outlet valve or other fitting to permit fluid to be introduced into and/or released from the inflatable article or bladder of the invention. While area 30 is shown as being conduit-shaped in FIG. 2, it should be understood by those in the art that area 30 may take any shape necessary to accommodate the fittings needed to inflate or deflate the inflatable article of manufacture or bladder.

It should also be realized by those skilled in the relevant art that while a particular negative bladder design or configuration has been illustrated in FIG. 2, the negative design of the bladder (and thus, the bladder ultimately formed by the method of the present invention) may take any shape required for the intended purpose or function of the inflatable article or bladder. For example, when used in footwear, the bladder may be configured to fit within the tongue of the shoe, along the medial and lateral sides, around the ankles and under the arch, heel or metatarsal heads. Similarly, the bladder may be designed to fit within the shell of a life preserver, chest protector, helmet, gloves or any other inflatable article of manufacture.

Likewise, the described linear and circular elements may be placed in any position to accommodate the function of the bladder and to control inflation and/or bulging of the bladder, as necessary. In addition, the linear and/or circular elements need not be linear or circular, but may be elongated, curved or of any geometry to meet the functional objectives of the bladder or the anatomy of the user, where the bladder is to be incorporated into an article of manufacture to be worn by a human.

Figure 3:
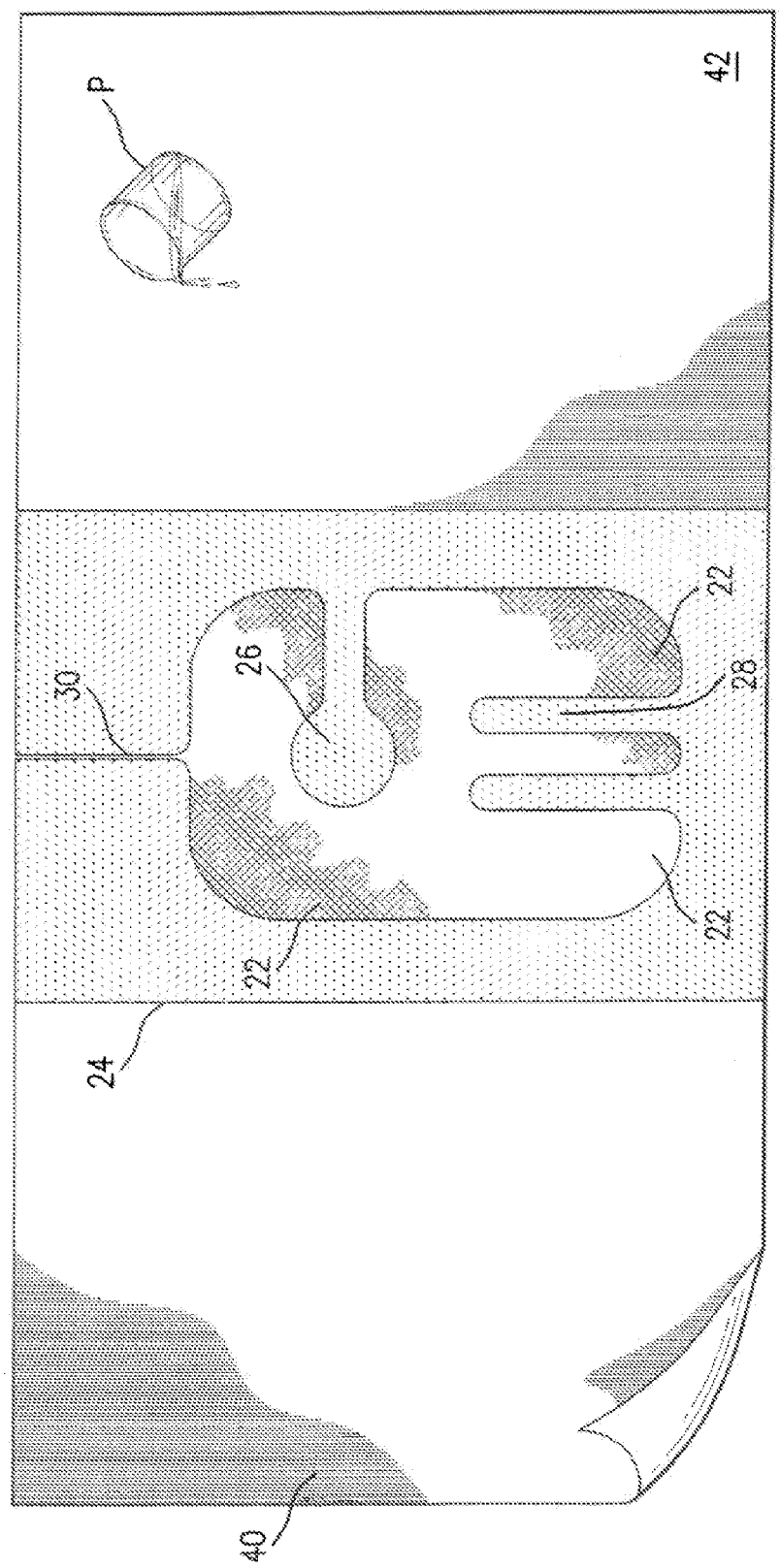
FIG. 3 is a depiction of the step of applying a barrier material to a first film of the method using the printing screen of FIG. 2.

Continuing with the steps of the method of the present invention, after creating a screen 24 with a negative image of the desired inflatable bladder design or configuration 20, screen 24 is placed on top of a first side 40 of first film 42, as shown in FIG. 3. A paint, ink or other media P is then applied to and pulled across screen 24 to transfer the configuration or design of the inflatable bladder onto first side 40 of first film 42, as visible area 22. Thus, by transferring the image of the inflatable bladder configuration onto the first side of the first film with paint, ink or other media, a barrier material is applied to the first side of the first film as required by Step 2 of the method of the present invention.

Figure 4:
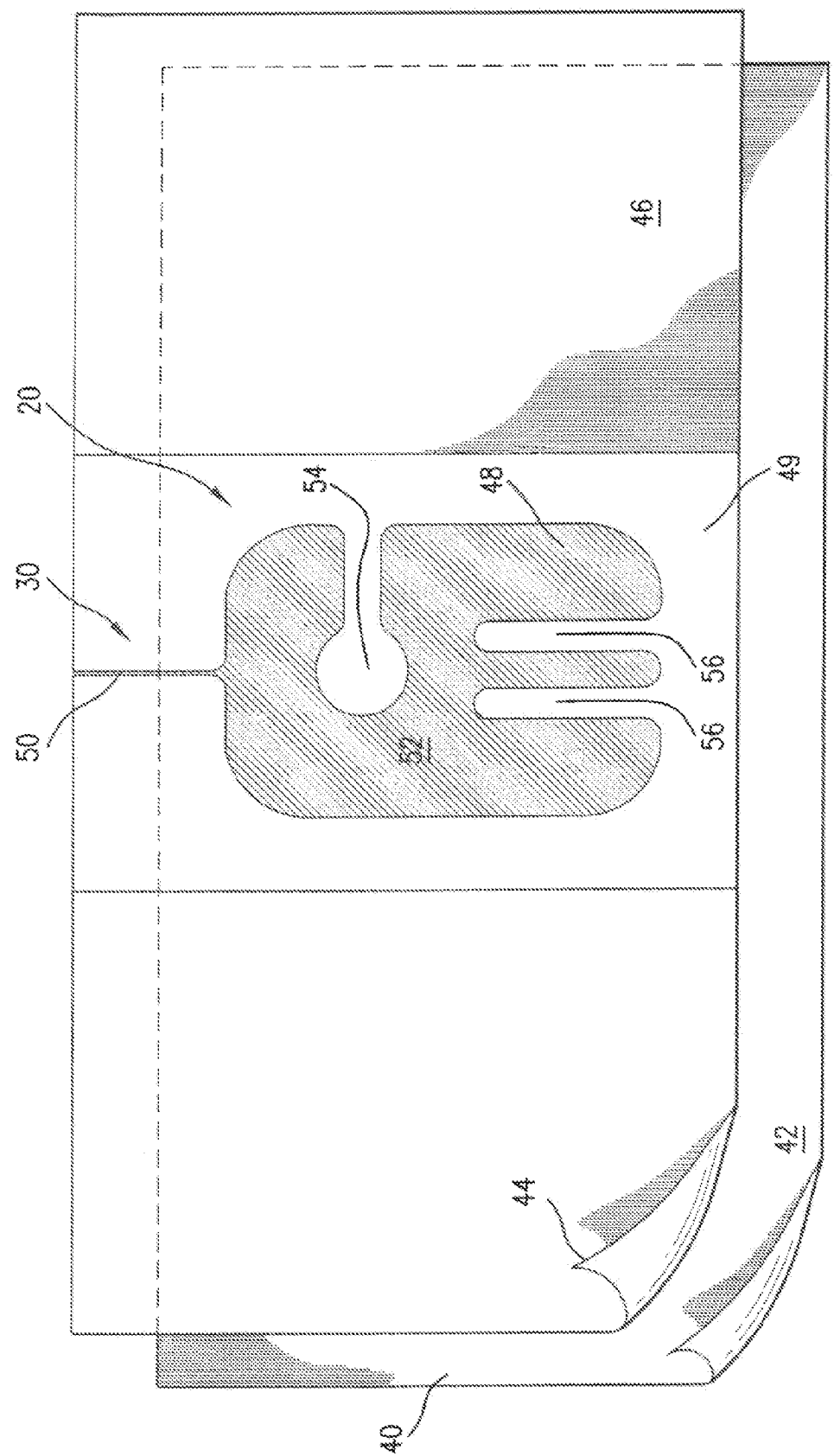
FIG. 4 is a depiction of the transferred barrier material positioned between the first and second films of the method.

FIG. 4 illustrates Step 3 of the method. In this step, a first side 44 of a second film 46 is positioned over first side 40 of first film 42, such that the barrier material image 48 of the inflatable bladder configuration 20 and the barrier material image 50 of the conduit 30 is positioned between first film 42 and second film 46. In FIG. 4, the barrier material is visible through second film 46.

In Step 4 of the method of the present invention, first film 42 is adhered to second film 46 so that the films are sealed together to form a sealed peripheral area except where the barrier material has been applied to the first film, to form at least one inflatable compartment. Where the barrier material has been applied to the first film, no adherence will occur to create the inflatable compartment of the resulting inflatable article or bladder. In FIG. 4, the sealed area is shown in hatched area 49, while the at least one inflatable compartment is shown at 52. Upon sealing, circular element 26 and linear elements 28 form circular and linear seals or welds 54, 56.

The first and second films may be adhered by a heated platten brought into contact with the films or the coextensive films could be fed together through heated rollers commonly known in the laminating art, for example. Other known means for sealing or laminating thermoplastic films (e.g., ultrasonic welding) could also be employed to achieve the objects of the present invention. The films could also be made photosensitive so that they would adhere to one another upon application of light.

Figure 5:
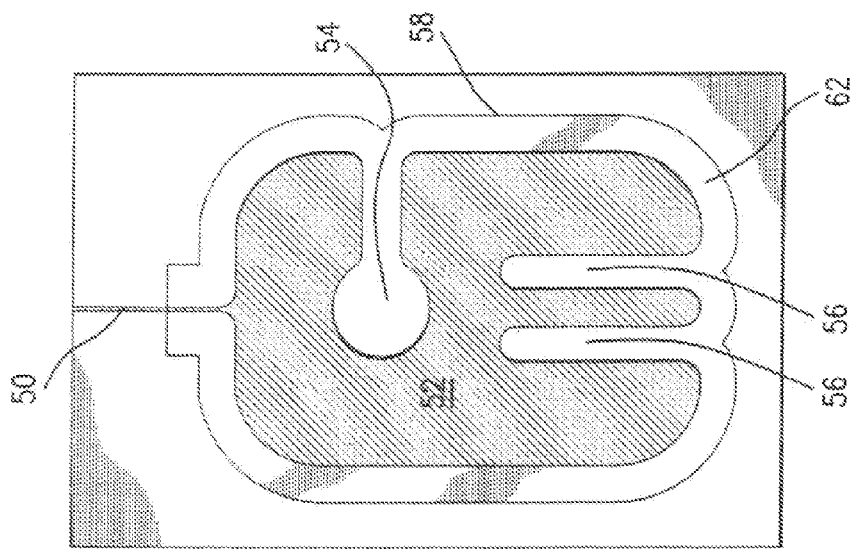
FIG. 5 is a depiction of the first and second films of the method as sealed together.
Figure 6:
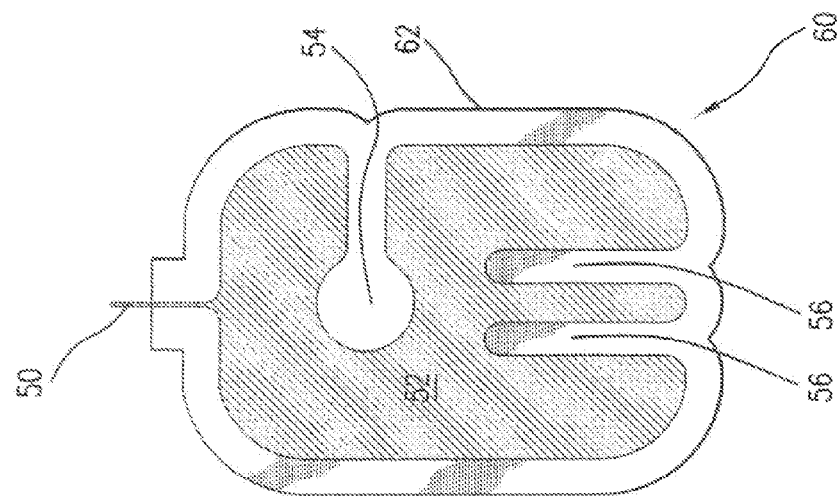
FIG. 6 is a depiction of an inflatable article or bladder made in accordance with the method of the present invention.

In Step 5 of the method, and as shown in FIG. 5, a cut is made along the edge of the sealed peripheral area near the inflatable compartment at cut line 58 to form an inflatable article or bladder 60 having at least one inflatable compartment 52, a circular weld 54, linear welds 56, a deflation/inflation conduit 50 and a peripheral edge 62 (see FIG. 6). This cut can be made by a cutting die configured in accordance with the pre-defined or customized bladder configuration (but slightly larger) or by other suitable cutting means such as laser cutting or water jet cutting.

Inflatable bladder 60 of FIG. 6 may be secured to or within an article of manufacture, for example, an article of footwear, by securing the bladder to the shoe components along peripheral edge 62 by stitching, an adhesive or other suitable fastening means.

Thus, as described above, the method of the present invention enables an inflatable article or bladder for an inflatable article, to be manufactured quickly, easily and without the use of expensive article or bladder configuration-specific, metal tooling. Indeed, the method of the present invention can be utilized with known silk-screening or printing and laminating techniques to allow for the continuous manufacture of multiple-shaped inflatable articles or bladders at relatively low cost. Moreover, and most advantageously, when a bladder configuration change is required, there is no need to order, machine and replace an expensive piece of metal tooling in the manufacturing process. Instead, a new screen/negative image of the newly desired bladder configuration is made and exchanged for the prior screen/ negative image—a simple, quick and inexpensive process, which is also compatible with the down-stream steps of the manufacturing process (i.e., adhering and cutting). Alternatively, a new screen/negative image could be digitally fed to the manufacturing process.

Returning to a discussion of Step 2 of the method of the present invention, the silk-screening technique described above is particularly advantageous for the manufacture of inflatable articles or bladders for consumer products in that silk-screening allows for the use of multiple colors to create bladders having visually appealing, colorized designs or cosmetics. It is also envisioned that multiple colors could be used with appropriately designed screens to transfer an image of a product trademark, brand or logo onto the films and, thus, the inflatable article or bladder.

While the barrier material and application step of the present invention has been described above with respect to paint or ink as used with a silk-screening or printing technique, it is envisioned that the barrier material may take other forms. For example, the barrier material may be an adhesive-backed paper, fabric or plastic material (such as polyethylene) applied to the first side of the first film to prevent the first and second films from adhering together to form at least one inflatable chamber.

It is also possible that the barrier material may be "free-floating" and not attached to either the first or second film. Indeed, the barrier material could be a particular type of film (or films) positioned between the first and second films that would not bond to the first and second films (e.g., the film would release from the first and second films as they cool, following the application of heat). Alternatively, the barrier material may be temporarily applied to one of the first or second films.

In another embodiment, the barrier material could be a particulate, soap, surfactant, release coating or spray, or a TEFLON® or silicone coating, sprayed over an appropriately shaped stencil to transfer the barrier material, in the desired article or bladder configuration, onto a first side of the first film to prevent the first and second films from adhering to each other during the sealing step of the invention.

In yet another embodiment of the invention, and utilizing the silk-screening or printing technique described above, the barrier material could also be an acid or other liquid chemical, which is transferred to a first side of the first film to chemically etch, corrode or abrade the first film, to inhibit attachment of the first film to the second. It is also envisioned that a photosensitive material could be transferred to the first film and subsequently exposed to light to meet the objectives of the barrier material of the invention.

In still another embodiment, the first film could be calendered between a hot roller and another hot or cold roller to apply or emboss a texture (having the overall desired bladder configuration) on one side of the first film to prevent it from adhering to the second film to form an inflatable compartment.

It is also envisioned that the method of present invention is capable of applying printing techniques (that is, printing films and rollers) used by the newspaper or printing industry to transfer a variety of inflatable article or bladder shapes onto a first film for adhering to a second film to form an inflatable compartment.

Figure 7:
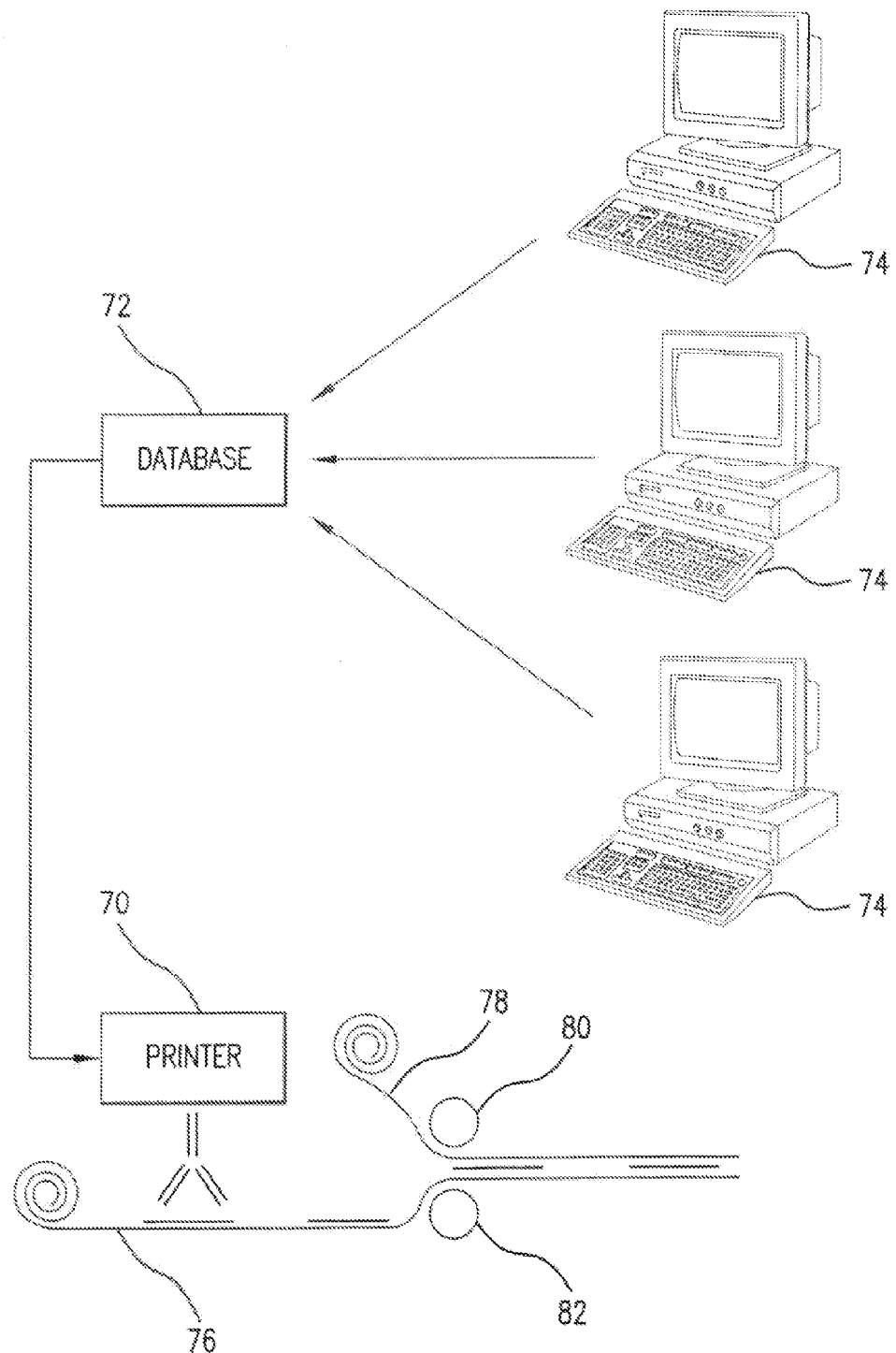
FIG. 7 is a depiction of an alternate embodiment of the step for applying a barrier material to a first film.

In another aspect of the invention, and with reference to FIG. 7, the above described embodiments of the invention can be utilized in conjunction with "on-demand" printing technology to create customized inflatable products. Specifically, the step of applying a barrier material to the first film could be accomplished by printing the barrier material on the film (possibly using the techniques described above) with a "smart" digital printer 70, which has access to a database 72 of customized information to create unique designs having customized bladder configurations, customized placement of circular and linear elements, and customized colors.

In practice, a customer of a shoe, for example, might enter into a computer 74 a specific color or design that the customer wants to appear on the shoe. The design could be indicia such as a name, words, or symbols or could be a photograph of a person or place. It is also envisioned that an anatomical scan of the customer's foot could be entered (e.g., at a point-of-purchase display) in order to enable customized manufacture of an inflatable article or bladder, which accommodates the anatomy of the customer's foot to enhance fit, cushioning and support. The entered information would then be transmitted to database 72 to which printer 70 has access. The printer would then access the database and print the unique design on a first film 76. First film 76 could be configured as a rolled sheet material, which is then joined with a similarly rolled second film 78. First film 76 and second film 78 would then be calendered through heated rollers 80,82 to adhere the films together and create the inflatable compartment of the bladder. The bladder would then be cut from the films using the methods described above. Where the bladder is cut from the films using a laser, the laser could also be made "smart" by connecting the laser to the database to control cutting of the bladder from the films, in accordance with the customized bladder design printed on the film. The present invention also contemplates that the bladder could be "cut" from the films by providing a cutting die with a chemical that corrodes, dissolves or "eats" through the films.

The method of the present invention is not only customizable, but is continuous in nature, in that there is no need to interrupt the steps of the method to change-out for bladder designs of differing configurations, colors or indicia. When the bladder is built into a shoe, the bladder may form an exoskeleton of the shoe as described in U.S. Pat. No. 5,343,638. Because the bladder has a design printed on the inside of the film, the design may be made visible on the outside of the shoe to form a unique customized shoe.

Similarly, the barrier material could take the form of a thermally reflective material to provide the bladder with insulating properties. The bladder could then be constructed into apparel, for example, to form an insulating shirt, jacket, vest, pant, or other article of apparel.

It is further envisioned that the barrier material could be a printed background design (for example, an underwater scene), and that the bladder could be filed with a fluid and ornamental elements (for example, plastic fish and sparkles), for use in children's wear or other articles of manufacture directed to a specific type of consumer.

It is also contemplated that the bladder could be formed from more than two films, to create a bladder having multiple layered inflatable compartments. In this embodiment, specific barrier materials and films could be selected so that each layered, inflatable compartment of the bladder has a different inflation quality or characteristic to address the objectives of the inflatable article of manufacture.

As noted above, the inflatable bladder formed by the method of the present invention also comprises a conduit 50 for coupling with an inflation or deflation valve. While this conduit serves as one means or structure for joining inflation and deflation fitments to the inflatable article or bladder per se, it is also envisioned that fitments known in the fluid transfer and control art could be attached to the article via an opening pre-formed in the second film prior to Step 3 of the method of the invention. It is also envisioned that materials known in the art for constructing one-way valves and other structure useful in the art of inflatable technology could be inserted between the first and second films to permit and control the ingress and egress of fluid from the inflatable compartment.

Figure 8A:
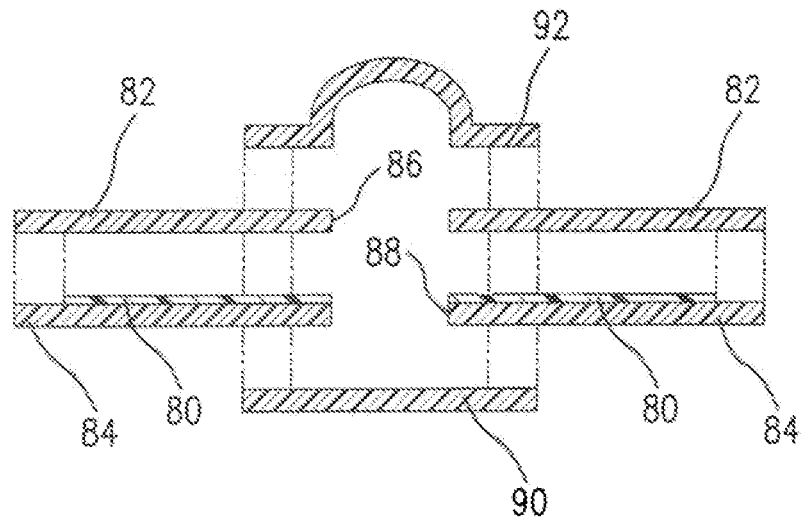
FIG. 8A is an exploded depiction of how to provide a fitment.
Figure 8B:
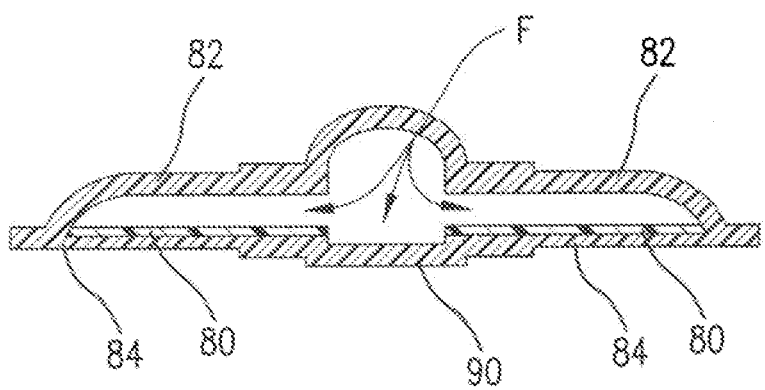
FIG. 8B is a depiction of the fitment as adhered to first and second films.

FIGS. 8A and 8B illustrate how a conventional fitment may be constructed into bladder 60 during the manufacturing process of the present invention. FIG. 8A shows the manufacturing process of the present invention after completion of Step 3, but before Step 4. As shown in FIG. 8A, a barrier material 80 is positioned between a first film 82 and a second film 84. First film 82 and second film 84 are both provided with an opening 86,88 suitably positioned for placement of a pump, inlet valve, release valve, or other known fitment for an inflatable bladder. A washer 90 constructed of a film material having properties similar or identical to second film 84 is positioned over opening 88. A fitment, for example, a digitally operated pump 92 constructed of a material having properties similar or identical to first film 82, is positioned over opening 86. Step 4 of the present invention is then performed to adhere first film 82 to second film 84 in all areas except where barrier material 80 has been applied to second film 84, and to adhere washer 90 to second film 84 and pump 92 to first film 82. Elements 82 and 84, 90 and 84, and 92 and 82 are adhered to one another in the areas noted by dashed lines (where barrier material 80 is absent). After completing Step 4, and as shown in FIG. 8B, the pump is adhered to the first film and the washer is adhered to the second film in an area of the bladder where an inflatable compartment or fluid conduit has been formed. Thus, fluid (illustrated by arrow F) is brought into the bladder, via the pump, to inflate the inflatable chamber defined by the area of application of the barrier material.

While a pump for bringing fluid into the bladder has been illustrated in FIGS. 8A and 8B, it should be noted that other fitments (for example, fluid release valves, fluid inlets, fluid regulators and check valves) may be attached to the films using the same technique. Further, it should be understood by those skilled in the art that other known techniques for securing fitments to inflatable bladders may be used with the method of the present invention.

The foregoing description of the specific embodiments will so fully reveal the general nature of the invention that others can, by applying the knowledge within the skill of the relevant art (including the contents of the references cited herein), readily modify and/or adapt for various applications such specific embodiments, without undue experimentation, without departing from the general concept and spirit of the present invention. Therefore, such adaptations and modifications are intended to be within the meaning and range of equivalents of the disclosed embodiments, based on the teaching and guidance presented herein. For example, the invention has been described in the context of a fluid-impervious film. Naturally, the characteristics of the film may be modified as a function of the fluid to be used in the bladder. If, for example, the bladder is intended to be used to contain a liquid or a large molecular-weight gas, the bladder may allow diffusion or reverse diffusion into and out of the bag without diverging from the spirit of the invention. Similarly, the bladder may be purposefully made porous to allow fluid to diffuse or escape from the bladder when a predetermined internal pressure is reached. This may be done by adding perforations to the film or by using films with known diffusion rates.

It is to be understood that the phraseology or terminology used herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for manufacturing a plurality of inflatable bladders for inflatable articles of footwear, comprising the steps of:
    (a) providing a first film;
    (b) forming a screen, template, or stencil of a negative image of a plurality of bladder configurations;
    (c) applying a barrier material to a first side of at least said first film in said plurality of bladder configurations using said screen, template, or stencil;
    (d) providing a second film with said first film, such that said barrier material is disposed between said first film and said second film;
    (e) coupling inflation and deflation devices to at least one of said first or second film at openings provided in the film;
    (f) adhering said first film to said second film to form sealed peripheral areas, except in areas where said barrier material has been applied to said first film, to form inflatable compartments corresponding in overall shape to said bladder configurations, and such that each one of said inflatable compartments has its own inflation and deflation device;
    (g) cutting along said sealed peripheral areas to form a plurality of bladders, each of said bladders having an inflatable compartment, a sealed peripheral edge, and an inflation and deflation device located within the sealed peripheral edge in fluid communication with the inflatable compartment to allow for inflation and deflation of the inflatable compartment; and
    (h) incorporating said bladders into footwear to form the inflatable articles of footwear.

2. A method for manufacturing a plurality of inflatable bladders, comprising the steps of:
    (a) providing a first film having a first side and a second side;
    (b) forming a screen, template, or stencil of a negative image of a plurality of bladder configurations;
    (c) applying a barrier material to said first side of at least said first film in said plurality of bladder configurations using said screen, template, or stencil;
    (d) providing a second film with said first side of said first film, such that said barrier material is disposed between said first film and said second film;
    (e) coupling inflation and deflation devices to at least one of said first or second film at openings provided in the film;
    (f) adhering said first film to said second film to form sealed peripheral areas, except in areas where said barrier material has been applied to said first side of said first film, to form inflatable compartments corresponding in overall shape to said bladder configurations, and such that each one of said inflatable compartments has its own inflation and deflation device; and
    (g) cutting along said sealed peripheral areas to form a plurality of bladders, each of said bladders having an inflatable compartment, a sealed peripheral edge, and an inflation and deflation device located within the sealed peripheral edge in fluid communication with the inflatable compartment to allow for inflation and deflation of the inflatable compartment.

3. A method for manufacturing a plurality of inflatable bladders, comprising the steps of:
    (a) providing a first film having a first side and a second side;
    (b) applying a barrier material to the first and second sides of the first film in a plurality of bladder configurations;
    (c) positioning the first film between a second film and a third film;
    (d) coupling inflation and deflation devices to at least one of said second or third film at openings provided in the film;
    (e) adhering the first, second, and third films to form sealed peripheral areas, except in the areas where the barrier material has been applied to the first and second sides of the first film, to form inflatable compartments corresponding in overall shape to said bladder configurations, such that each one of said inflatable compartments has its own inflation and deflation device; and
    (f) cutting along said sealed peripheral areas to form a plurality of inflatable bladders, each of said bladders having an inflatable compartment and a sealed peripheral edge, and an inflation and device located within the sealed peripheral edge in fluid communication with the inflatable compartment to allow for inflation and deflation of the inflatable compartment.

* * * * *